United States Patent
Karri et al.

(10) Patent No.: US 11,735,062 B2
(45) Date of Patent: Aug. 22, 2023

(54) DELIVERING EDUCATIONAL CONTENT USING CONNECTED DEVICES

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Shailendra Moyal, Pune (IN); Akash U. Dhoot, Pune (IN); Madhukar Hari Kishan Gobbi, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/134,591

(22) Filed: Dec. 28, 2020

(65) Prior Publication Data

US 2022/0208020 A1 Jun. 30, 2022

(51) Int. Cl.
*G09B 19/00* (2006.01)
*G06N 20/00* (2019.01)
*G06F 40/279* (2020.01)

(52) U.S. Cl.
CPC .............. *G09B 19/00* (2013.01); *G06N 20/00* (2019.01); *G06F 40/279* (2020.01)

(58) Field of Classification Search
CPC .................................................. G06N 20/00
See application file for complete search history.

(56) References Cited

U.S. PATENT DOCUMENTS

| | | | |
|---|---|---|---|
| 8,078,676 B2 * | 12/2011 | Dalal | G06Q 50/205 709/204 |
| 9,849,364 B2 | 12/2017 | Tran | |
| 2013/0059284 A1 | 3/2013 | Giedgowd, Jr. | |
| 2014/0046717 A1 * | 2/2014 | Yuan | G06Q 50/20 705/7.21 |
| 2015/0017625 A1 * | 1/2015 | Yoo | G09B 7/00 434/350 |
| 2015/0079554 A1 * | 3/2015 | Lee | G09B 7/00 434/157 |
| 2018/0158458 A1 | 6/2018 | Weber | |
| 2018/0374371 A1 * | 12/2018 | Anderson | G09B 7/06 |

(Continued)

FOREIGN PATENT DOCUMENTS

CN 106652607 A 5/2017

OTHER PUBLICATIONS

Acer, Acer TravelMate B1 Touch User Manual, revised Dec. 2016, published by Acer, pp. 34-42 (Year: 2016).*

(Continued)

*Primary Examiner* — Robert J Utama
*Assistant Examiner* — Correll T French
(74) *Attorney, Agent, or Firm* — Gavin Giraud

(57) ABSTRACT

Approaches presented herein enable delivery of educational content. More specifically, a lesson plan comprising the educational content is received. An inventory of one or more network-connected devices within a pre-determined perimeter is conducted. One or more learning activities are associated with each of the one or more network-connected devices. At least one learning activity of the one or more learning activities is selected based on the lesson plan. A curriculum comprising the lesson plan and the at least one learning activity is delivered to a user.

20 Claims, 4 Drawing Sheets

(56) References Cited

U.S. PATENT DOCUMENTS

2019/0258367 A1* 8/2019 Root .................... G06F 3/0484
2021/0142690 A1* 5/2021 Wenger .................. G09B 7/08

OTHER PUBLICATIONS

Abdel-Basset et al., "Internet of things in smart education environment: Supportive framework in the decision-making process", Wiley, Special Issue Paper, Accepted: Mar. 21, 2018, 22 pages.

Cohen, Hayden, "An Introduction to IoT Applications in Education", iot for all, Jun. 30, 2020, <https://www.iotforall.com/introduction-iot-applications-in-education/>, 14 pages.

Wright, David, "Smart Home Technology Adoption and Learning", 2019 IEEE International Professional Communication Conference (ProComm), 4 pages.

\* cited by examiner

DELIVERING EDUCATIONAL CONTENT USING CONNECTED DEVICES

TECHNICAL FIELD

The present invention relates generally to delivering educational content and, more specifically, to using a network-connected device to perform a learning activity in conjunction with a lesson plan.

BACKGROUND

Network-connected devices are increasingly being used in domestic/home environments. Smart TVs and other smart appliances, environmental controls such as thermostats, and other network-connected devices comprise what is generally referred to as the "Internet of Things" (IoT). While these network-connected devices have a primary purpose in the home of the user, these devices may also be used for other purposes.

SUMMARY

Approaches presented herein enable delivery of educational content. More specifically, a lesson plan comprising the educational content is received. An inventory of one or more network-connected devices within a pre-determined perimeter is conducted. One or more learning activities are associated with each of the one or more network-connected devices. At least one learning activity of the one or more learning activities is selected based on the lesson plan. A curriculum comprising the lesson plan and the at least one learning activity is delivered to a user.

One aspect of the present invention includes a computer-implemented method for delivering educational content, the computer-implemented comprising: receiving a lesson plan comprising the educational content, conducting an inventory of one or more network-connected devices within a pre-determined perimeter, wherein one or more learning activities are associated with each of the one or more network-connected devices, selecting at least one learning activity of the one or more learning activities, wherein the selecting is based on the lesson plan, and delivering a curriculum comprising the lesson plan and the at least one learning activity to a user.

Another aspect of the present invention includes a computer system for delivering educational content, the computer system comprising: a memory medium comprising program instructions, a bus coupled to the memory medium, and a processor, for executing the program instructions, coupled to an educational content delivery engine via the bus that when executing the program instructions causes the system to: receive a lesson plan comprising the educational content, conduct an inventory of one or more network-connected devices within a pre-determined perimeter, wherein one or more learning activities are associated with each of the one or more network-connected devices, select at least one learning activity of the one or more learning activities, wherein the selecting is based on the lesson plan, and deliver a curriculum comprising the lesson plan and the at least one learning activity to a user.

Yet another aspect of the present invention includes a computer program product for delivering educational content, the computer program product comprising a computer readable hardware storage device, and program instructions stored on the computer readable hardware storage device, to: receive a lesson plan comprising the educational content, conduct an inventory of one or more network-connected devices within a pre-determined perimeter, wherein one or more learning activities are associated with each of the one or more network-connected devices, select at least one learning activity of the one or more learning activities, wherein the selecting is based on the lesson plan, and deliver a curriculum comprising the lesson plan and the at least one learning activity to a user.

Still yet, any of the components of the present invention could be deployed, managed, serviced, etc., by a service provider who offers to implement delivering educational content in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
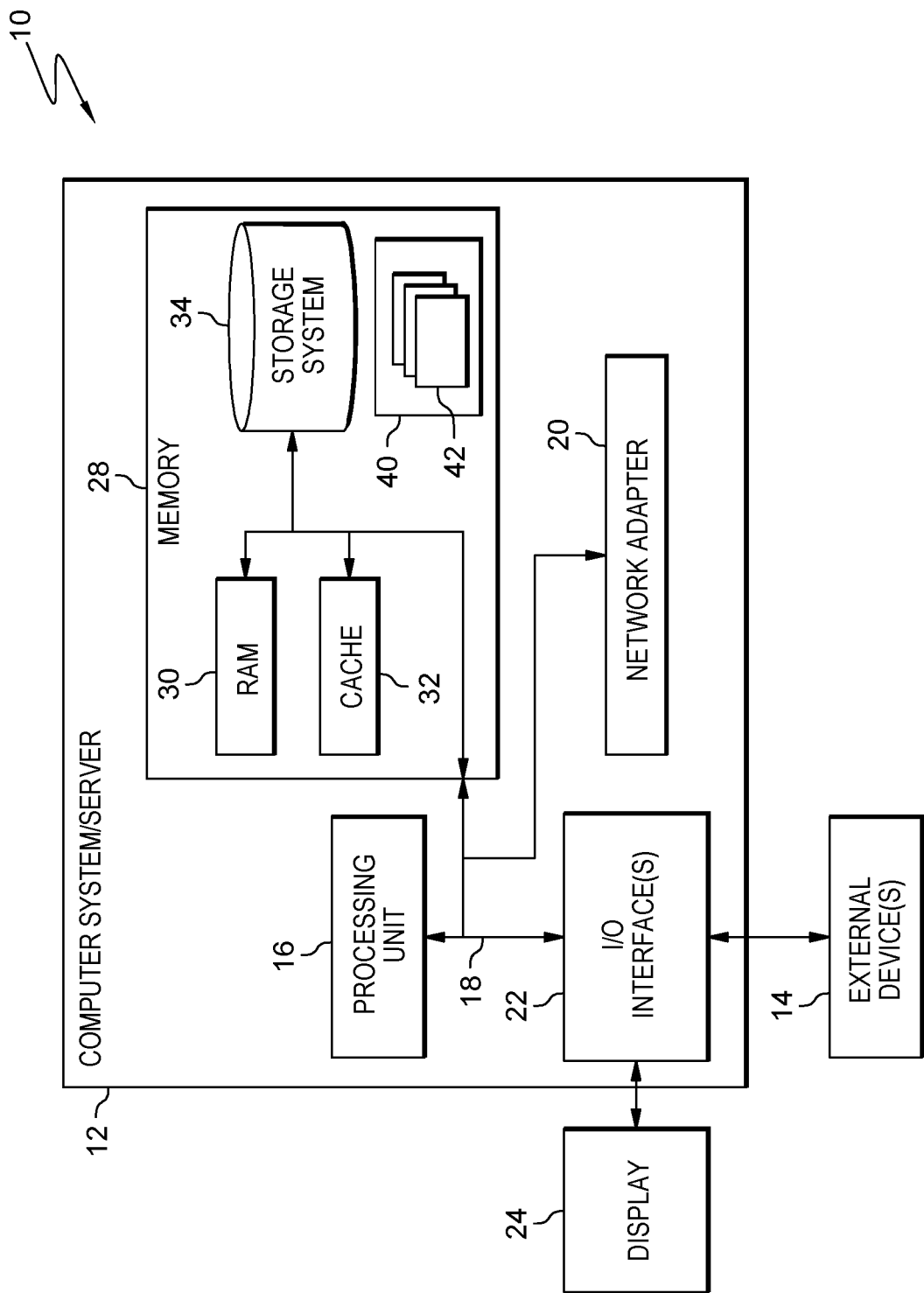
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for delivery of educational content. More specifically, a lesson plan comprising the educational content is received. An inventory of one or more network-connected devices within a pre-determined perimeter is conducted. One or more learning activities are associated with each of the one or more network-connected devices. At least one learning activity of the one or more learning activities is selected based on the lesson plan. A curriculum comprising the lesson plan and the at least one learning activity is delivered to a user.

Referring now to FIG. 1, a computerized implementation 10 of an embodiment for delivering educational content will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for delivering educational content. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for delivering educational content, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that existing approaches to delivering educational content have significant limitations, that these approaches rely primarily on audio or video delivery of content, and do not provide illustrative examples using network-connected devices. Consequently, these existing approaches are not as effective in delivering educational content, and educational recipients do not learn or retain the content as well as those who receive illustrative examples to reinforce the content.

Accordingly, the inventors of the present invention have developed a system that utilizes network-connected devices to provide illustrative examples related to educational content. Viewing and participating in examples using network-connected devices allows educational recipients to understand educational content in a broader context, and to more effectively learn and recall the educational content.

Furthermore, embodiments of the present invention offer several advantages for delivering educational content, such as: utilizing network-connected devices that are commonly found in households to provide illustrative examples, allowing network-connected devices to opt-in to being utilized for delivering educational content, utilizing an artificial intelligence (AI) system to match and optimize learning activities with a lesson plan, creating instructions for performing learning activities by processing text or speech using an artificial intelligence (AI) system, processing instructions for performing learning activities and responses of an educational content recipient to the learning activities using natural language processing, and maintaining a calendar for scheduling utilization of the network-connected devices such that time slots on the calendar may be reserved for an educational content recipient to perform the learning activities that are associated with the network-connected devices.

Figure 2:
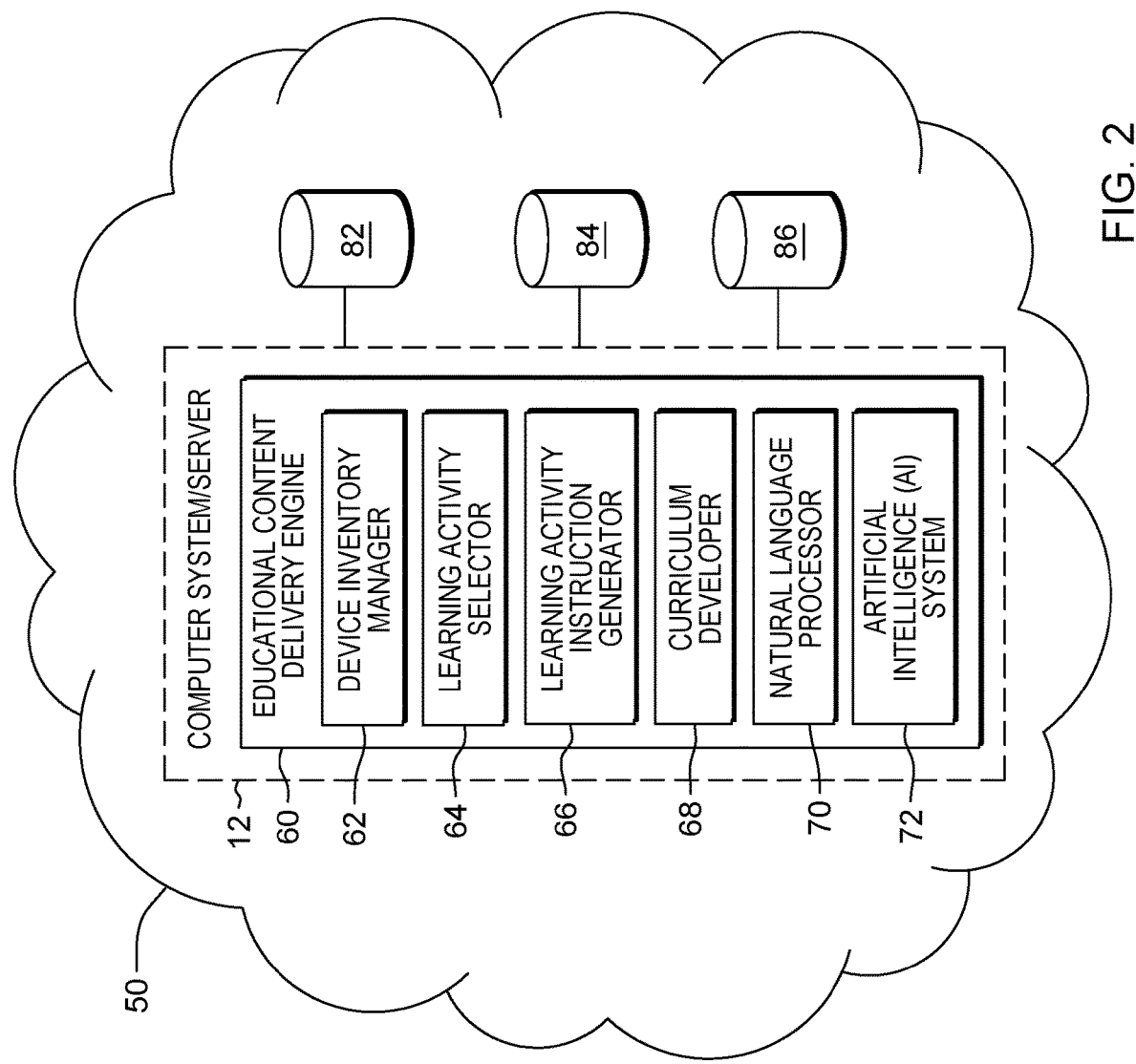
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2 for illustrative purposes only. In the event the teachings recited herein are practiced in a networked computing environment, each client need not have an educational content delivery engine 60 (hereinafter "system 60"). Rather, all or part of system 60 could be loaded on a server or server-capable device that communicates (e.g., wirelessly) with the clients to provide for educational content delivery. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions. Specifically, among other functions, system 60 can deliver educational content in a networked computing environment. To accomplish this, system 60 can include a set of components (e.g., program modules 42 of FIG. 1) for carrying out embodiments of the present invention. These components can include, but are not limited to, device inventory manager 62, learning activity selector 64, learning activity instruction generator 66, curriculum developer 68, natural language processor 70, and artificial intelligence (AI) system 72.

Through computer system/server 12, system 60 can deliver educational content to a user, for example, a student, a child, or any other type of person who desires to receive educational content. Lesson plans comprising the educational content are stored in lesson plan database 82. Device inventory manager 62 conducts an inventory of one or more network-connected devices within a pre-determined perimeter. In one embodiment, this may be devices within a geographic location perimeter such as devices located within a building or house, or devices located within a particular physical distance (e.g. 100 ft) of manager 62. In another embodiment, this may be devices within a network location perimeter such as devices located on a particular network, network type (e.g. ethernet), or a specific IP address range of a network. Device inventory manager 62 may conduct the inventory by querying or pinging network-connected devices within the geographic or network location perimeters.

One or more learning activities, which are stored in learning activity database 84, are associated with each of the network-connected devices that are identified in the inventory conducted by device inventory manager 62. Learning activity selector 64 selects at least one learning activity from among the learning activities stored in database 84, based on the lesson plan. In one embodiment, selecting of network-connected devices is enabled based upon a network interface of the devices being set to an opt-in mode. Selector 64 uses artificial intelligence (AI) system 72 to perform pattern matching, text matching, and optimization between the lesson plan and the learning activities to determine commonality and applicability. The use of pattern matching, text matching, and optimization by AI systems is known, and further description is not believed necessary.

Learning activity instruction generator 66 uses artificial intelligence (AI) system 72 to process text or speech of the one or more learning activities stored in learning activity database 84 to create instructions for performing the learning activities. Natural language processor 70 may be used to convert speech data of the learning activities into text. Generator 66 uses AI system 72 to perform pattern matching, text matching, and optimization between the lesson plan, the learning activities, and device documentation (e.g. manuals) for the respective network-connected devices. Based on the pattern matching, text matching, and optimization, AI system 72 integrates operations instructions from the device documentation, text of the learning activities, and the lesson plan to create the instructions for performing the learning activities.

Curriculum Developer 68 integrates the instructions for performing the learning activities and the lesson plan into a curriculum that is delivered to the user. Natural language processor 70 may be used to process and convert the instructions for performing the learning activities into speech, or to process and convert the speech responses of the user to the learning activities into text for further processing by the network-connected devices or AI system 72.

Device scheduling calendar 86 may be maintained for scheduling utilization of the one or more network-connected devices, and one or more time slots on calendar 86 may be reserved for the user to perform the one or more learning activities that are associated with selected ones of the one or more network-connected devices.

Figure 3:
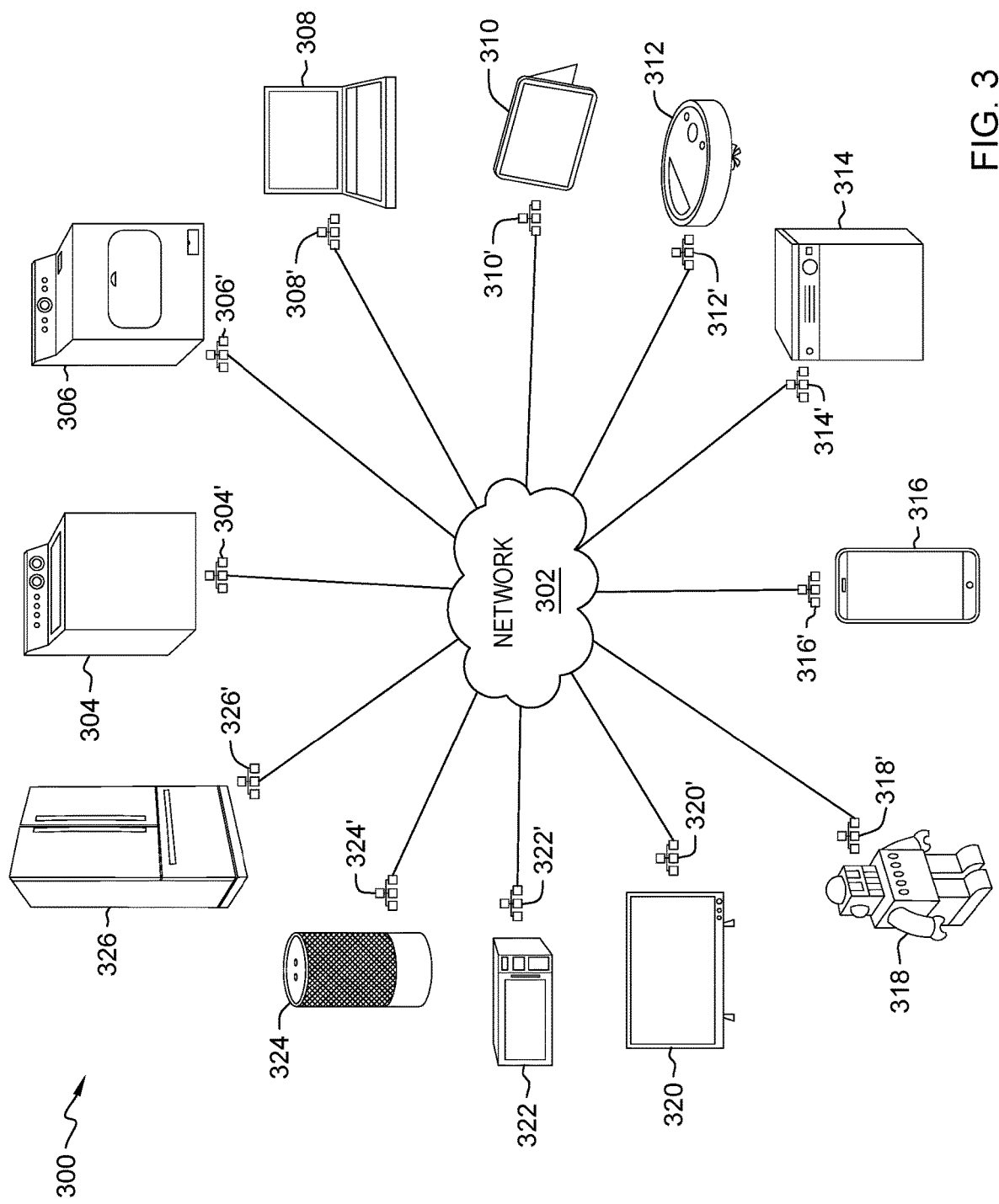
FIG. 3 shows a networked environment according to illustrative embodiments.

Referring now to FIG. 3 in connection with FIG. 2, networked environment 300 is shown. Network-connected devices that are connected and addressable using network 302 include: washing machine 304, dryer 306, laptop computer 308, virtual assistant 310, robot vacuum 312, dish washer 314, phone 316, toy 318, television 320, microwave oven 322, speaker 324, and refrigerator 326. Each of the foregoing network-connected devices have respective network interfaces, 304'-326'. In embodiments, the network interfaces may utilize a wired network connection (e.g. ethernet), a Wi-Fi wireless connection (e.g. Wireless-N), a cellular wireless connection (e.g. 4G), or any other type of network connection.

Figure 4:
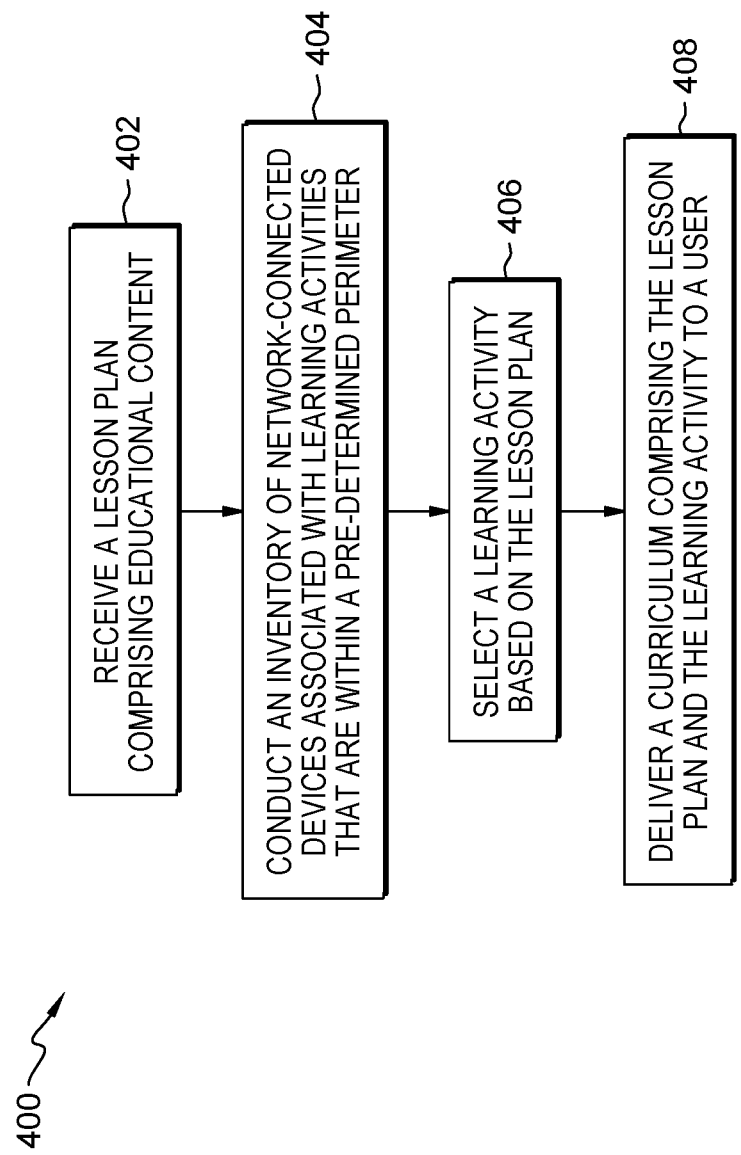
FIG. 4 shows a process flowchart for delivering educational content according to illustrative embodiments.

As depicted in FIG. 4, in one embodiment, a system (e.g., computer system/server 12) carries out the methodologies disclosed herein. Shown is a process flowchart 400 for delivering educational content. At 402, a lesson plan comprising educational content is received. At 404, an inventory of network-connected devices that are within a pre-determined perimeter, and which are associated with learning activities, is conducted. At 406, a learning activity which is based on the lesson plan is selected. At 408, a curriculum comprising the lesson plan and the learning activity is delivered to a user.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for delivering educational content. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for delivering educational content. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to delivering educational content. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for delivering educational content, the computer-implemented method comprising:
   receiving a lesson plan comprising educational content;
   conducting an inventory by pinging one or more network-connected devices within a pre-determined perimeter using signals over a network for each of the one or more network-connected devices, wherein the one or more network-connected devices comprise a selection from the group consisting of: a washing machine, a dryer, a robot vacuum, a dish washer, a microwave oven, and a refrigerator;
   associating one or more learning activities with each of the one or more network-connected devices after conducting the inventory;
   performing pattern matching, using an artificial intelligence (AI) system, between the lesson plan and each of the one or more learning activities, wherein the learning activities are based on device documentation that provides illustrative examples for delivering the educational content through each of the one or more network-connected devices;
   selecting at least one learning activity of the one or more learning activities, wherein the selecting is based on the pattern matching;
   delivering a curriculum comprising the lesson plan and the at least one learning activity to a user, wherein the curriculum integrates instructions for performing the at least one learning activity based on the device documentation, text of the learning activities, and the lesson plan; and
   conducting the at least one learning activity with the one or more network-connected devices.

2. The computer-implemented method of claim 1, further comprising:
   selecting at least one device from the one or more network-connected devices based upon the network interface of the at least one device being set to an opt-in mode.

3. The computer-implemented method of claim 2, wherein selecting the at least one device comprises using the AI system to match the at least one learning activity with the lesson plan.

4. The computer-implemented method of claim 1, wherein the pre-determined perimeter comprises a geographic location perimeter or a network location perimeter.

5. The computer-implemented method of claim 1, wherein the one or more learning activities comprise text or speech, and instructions for performing the one or more learning activities are created by processing the text or speech using the AI system.

6. The computer-implemented method of claim 5, wherein the instructions for performing the one or more learning activities and one or more responses of the user to the learning activities are processed using natural language processing.

7. The computer-implemented method of claim 1, wherein a calendar is maintained for scheduling utilization of the one or more network-connected devices, and one or more time slots on the calendar may be reserved for the user to perform the one or more learning activities that are associated with selected ones of the one or more network-connected devices.

8. A computer system for delivering educational content, the computer system comprising:
   a memory medium comprising program instructions;
   a bus coupled to the memory medium; and
   a processor, for executing the program instructions, coupled to an educational content delivery engine via the bus that when executing the program instructions causes the system to:
   receive a lesson plan comprising educational content;
   conduct an inventory by pinging one or more network-connected devices within a pre-determined perimeter using signals over a network interface for each of the one or more network-connected devices, wherein the one or more network-connected devices comprise a selection from the group consisting of: a washing machine, a dryer, a robot vacuum, a dish washer, a microwave oven, and a refrigerator;
   associate one or more learning activities with each of the one or more network-connected devices after conducting the inventory;
   perform pattern matching, using an artificial intelligence (AI) system, between the lesson plan and each of the one or more learning activities, wherein the learning activities are based on device documentation that provides illustrative examples for delivering the educational content through each of the one or more network-connected devices;
   select at least one learning activity of the one or more learning activities, wherein the selecting is based on the pattern matching;
   deliver a curriculum comprising the lesson plan and the at least one learning activity to a user, wherein the curriculum integrates instructions for performing the at least one learning activity based on the device documentation, text of the learning activities, and the lesson plan; and
   conducting the at least one learning activity with the one or more network-connected devices.

9. The computer system of claim 8, the instructions further causing the system to:
   select at least one device from the one or more network-connected devices based upon the network interface of the at least one device being set to an opt-in mode.

10. The computer system of claim 9, wherein selecting the at least one device comprises using the AI system to match the at least one learning activity with the lesson plan.

11. The computer system of claim 8, wherein the pre-determined perimeter comprises a geographic location perimeter or a network location perimeter.

12. The computer system of claim 8, wherein the one or more learning activities comprise text or speech, and instructions for performing the one or more learning activities are created by processing the text or speech using the AI system.

13. The computer system of claim 12, wherein the instructions for performing the one or more learning activities and one or more responses of the user to the learning activities are processed using natural language processing.

14. The computer system of claim 8, wherein a calendar is maintained for scheduling utilization of the one or more network-connected devices, and one or more time slots on the calendar may be reserved for the user to perform the one or more learning activities that are associated with selected ones of the one or more network-connected devices.

15. A computer program product for delivering educational content, the computer program product comprising a computer readable hardware storage device, and program instructions stored on the computer readable hardware storage device, to:
   receive a lesson plan comprising educational content;
   conduct an inventory by pinging one or more network-connected devices within a pre-determined perimeter using signals over a network interface for each of the one or more network-connected devices, wherein the one or more network-connected devices comprise a selection from the group consisting of: a washing machine, a dryer, a robot vacuum, a dish washer, a microwave oven, and a refrigerator;
   associate one or more learning activities with each of the one or more network-connected devices after conducting the inventory;
   perform pattern matching, using an artificial intelligence (AI) system, between the lesson plan and each of the one or more learning activities, wherein the learning activities are based on device documentation that provides illustrative examples for delivering the educational content through each of the one or more network-connected devices;
   select at least one learning activity of the one or more learning activities, wherein the selecting is based on the pattern matching;
   deliver a curriculum comprising the lesson plan and the at least one learning activity to a user, wherein the curriculum integrates instructions for performing the at least one learning activity based on the device documentation, text of the learning activities, and the lesson plan; and
   conducting the at least one learning activity with the one or more network-connected devices.

16. The computer program product of claim 15, the computer readable storage device further comprising instructions to:
   select at least one device from the one or more network-connected devices, wherein the selecting is enabled based upon a network interface of the at least one device being set to an opt-in mode.

17. The computer program product of claim 16, wherein selecting the at least one device comprises using the AI system to match the at least one learning activity with the lesson plan.

18. The computer program product of claim 15, wherein the pre-determined perimeter comprises a geographic location perimeter or a network location perimeter.

19. The computer program product of claim 15, wherein the one or more learning activities comprise text or speech, and instructions for performing the one or more learning activities are created by processing the text or speech using the AI system.

20. The computer program product of claim 19, wherein the instructions for performing the one or more learning activities and one or more responses of the user to the learning activities are processed using natural language processing, and wherein a calendar is maintained for scheduling utilization of the one or more network-connected devices, and one or more time slots on the calendar may be reserved for the user to perform the one or more learning activities that are associated with selected ones of the one or more network-connected devices.

* * * * *